US010193157B2

(12) United States Patent
Hosaka et al.

(10) Patent No.: US 10,193,157 B2
(45) Date of Patent: Jan. 29, 2019

(54) NEGATIVE ELECTRODE FOR LITHIUM ION SECONDARY BATTERY, AND LITHIUM ION SECONDARY BATTERY USING THE SAME

(71) Applicant: TDK CORPORATION, Tokyo (JP)

(72) Inventors: Nobuyuki Hosaka, Tokyo (JP); Yasuhiro Ikeda, Tokyo (JP); Kazumasa Tanaka, Tokyo (JP); Atsushi Sano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 14/897,554

(22) PCT Filed: Jun. 11, 2014

(86) PCT No.: PCT/JP2014/065411
§ 371 (c)(1),
(2) Date: Dec. 10, 2015

(87) PCT Pub. No.: WO2014/200003
PCT Pub. Date: Dec. 18, 2014

(65) Prior Publication Data
US 2016/0141626 A1 May 19, 2016

(30) Foreign Application Priority Data
Jun. 12, 2013 (JP) ................. 2013-123721

(51) Int. Cl.
*H01M 4/62* (2006.01)
*H01M 4/134* (2010.01)
(Continued)

(52) U.S. Cl.
CPC .......... *H01M 4/622* (2013.01); *H01M 4/134* (2013.01); *H01M 4/386* (2013.01); *H01M 4/48* (2013.01);
(Continued)

(58) Field of Classification Search
None
See application file for complete search history.

(56) References Cited

U.S. PATENT DOCUMENTS 6,325,218 B1 * 12/2001 Lee ................. B01D 61/02
210/490
2004/0202706 A1 10/2004 Koo et al.
2012/0328949 A1 * 12/2012 Yamaguchi ........... H01M 4/505
429/224

FOREIGN PATENT DOCUMENTS

JP 2000-348730 A 12/2000
JP 2001-513437 A 9/2001
(Continued)

OTHER PUBLICATIONS

Machine Translation of Japanese Patent Publication 2000-348730 published Dec. 2000.*
(Continued)

*Primary Examiner* — Wyatt P McConnell
(74) *Attorney, Agent, or Firm* — Oliff PLC

(57) ABSTRACT

A negative electrode for a lithium ion secondary battery, which has high energy density and which can suppress a crease (form change) of a negative electrode active material layer and a negative electrode current collector caused by the expansion and contraction occurring along with the quick charging and discharging and also suppress the falloff of the negative electrode active material layer after the quick charging and discharging cycle, and a lithium ion secondary battery using the negative electrode. The negative electrode for a lithium ion secondary battery and the lithium ion secondary battery include: a negative electrode active material including 5% or more of silicon or silicon oxide; a binder that is polyacrylate whose carboxylic groups at terminals of side chains of polyacrylic acid are cross-linked with magnesium or alkaline earth metal; and a negative electrode current collector.

12 Claims, 1 Drawing Sheet

(51) Int. Cl.
*H01M 4/38* (2006.01)
*H01M 4/485* (2010.01)
*H01M 10/0525* (2010.01)
*H01M 4/48* (2010.01)
*H01M 4/02* (2006.01)

(52) U.S. Cl.
CPC ....... *H01M 4/485* (2013.01); *H01M 10/0525* (2013.01); *H01M 2004/027* (2013.01); *Y02T 10/7011* (2013.01)

(56) References Cited

FOREIGN PATENT DOCUMENTS

| | | |
|---|---|---|
| JP | 2006-517224 A | 7/2006 |
| JP | 2010-097761 A | 4/2010 |

OTHER PUBLICATIONS

Jul. 8, 2014 Search Report issued in International Patent Application No. PCT/JP2014/065411.
Jul. 8, 2014 Written Opinion issued in International Patent Application No. PCT/JP2014/065411.

* cited by examiner

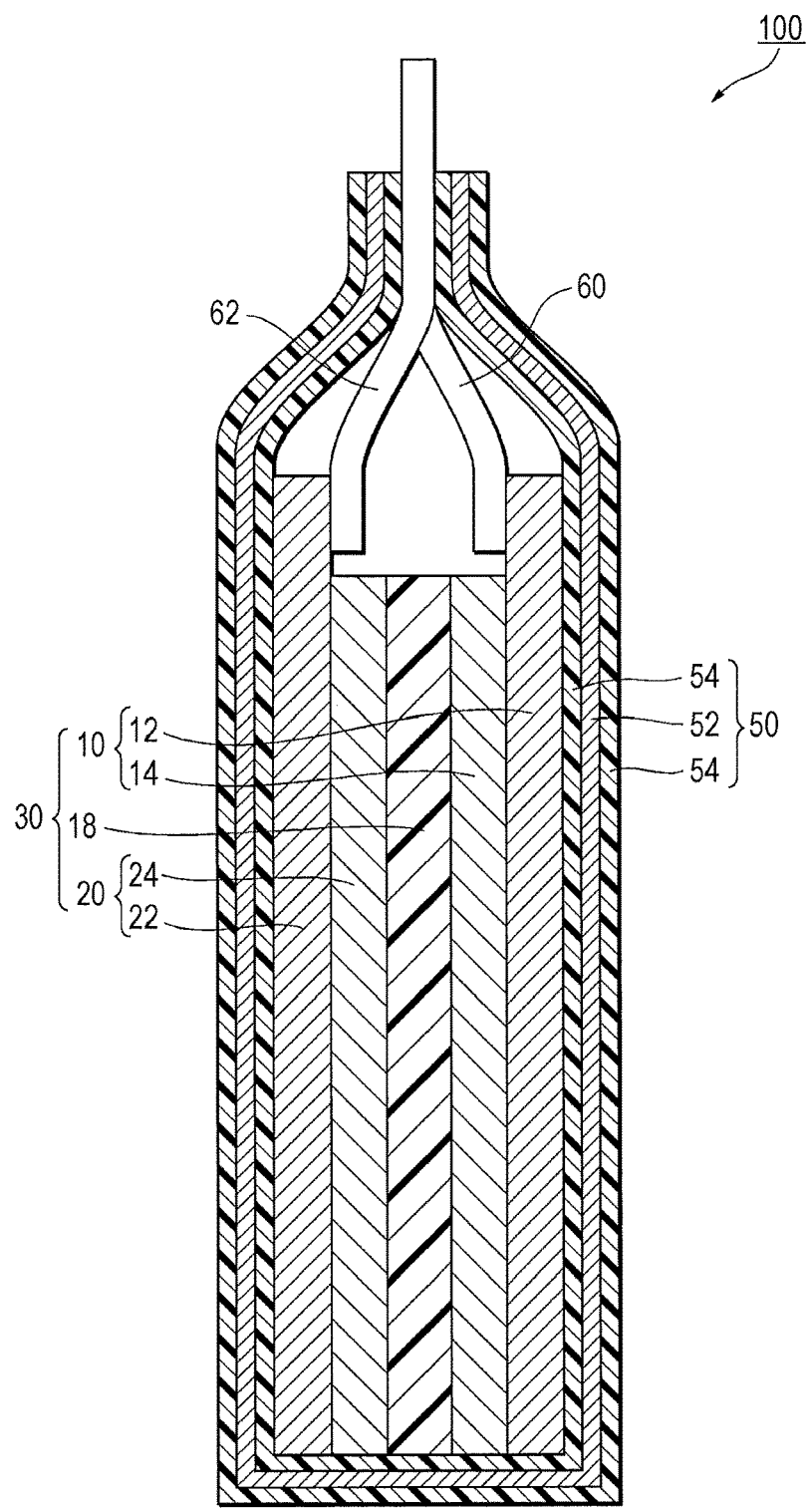

NEGATIVE ELECTRODE FOR LITHIUM ION SECONDARY BATTERY, AND LITHIUM ION SECONDARY BATTERY USING THE SAME

TECHNICAL FIELD

The present invention relates to a negative electrode for a lithium ion secondary battery, and a lithium ion secondary battery using the same.

BACKGROUND ART

A lithium ion secondary battery is lighter in weight and has higher capacity than a nickel-cadmium battery, a nickel hydrogen battery, and the like. For this reason, the lithium ion secondary batteries have been widely used as a power supply for mobile electronic appliances. The lithium ion secondary battery is also a strong candidate for a power supply to be mounted on hybrid automobiles and electric automobiles. With the size reduction and higher sophistication of the mobile electronic appliances in recent years, the lithium ion secondary battery used for the power supply is expected to have higher capacity.

In view of the above, an alloy-based negative electrode material including silicon and silicon oxide has attracted attention. Silicon can electrochemically intercalate and deintercalate lithium ions. Silicon enables the charging and discharging with much higher capacity than graphite. In particular, it is known that silicon exhibits a theoretical discharging capacity of 4,210 mAh/g, which is 11 times as high as that of graphite.

However, when silicon or a silicon compound is used as a negative electrode active material, the expansion and contraction of an electrode caused by the intercalation and deintercalation of lithium ions along with the charging and discharging are remarkably larger than those in the case of using graphite as a negative electrode active material. Therefore, in the lithium ion secondary battery using an alloy-based negative electrode material of silicon or the like as the negative electrode active material, the negative electrode active material layer expands or contracts due to the repetition of the charging and discharging. This applies a large stress on the negative electrode.

This may result in problems that the crack occurs in the negative electrode active material layer formed on a negative electrode current collector, and the negative electrode active material layer and the negative electrode current collector are separated. As a result, the conductive path is blocked between the negative electrode active material and the negative electrode active material and between the negative electrode active material and the negative electrode current collector. This leads to the lower cycle characteristic of the lithium ion secondary battery.

In view of the above problem, Patent Literature 1 suggests to use the polyacrylic resin, which has a predetermined mechanical characteristic, as the negative electrode binder in order to improve the adhesion between the negative electrode active material layer and the negative electrode current collector and to suppress the volume expansion of the negative electrode. Since the polyacrylic resin can use water as the solvent, the polyacrylic resin has advantages that the environmental burden in the fabrication is small and the cost can be suppressed.

In general, as the adhesion between the negative electrode active material layer and the negative electrode current collector is higher, the falloff of the negative electrode active material layer in the charging/discharging cycle is small. The deterioration is therefore suppressed. For this reason, the resin with higher adhesion is more preferable. However, too high adhesion between the polyacrylic acid and the negative electrode current collector is a problem.

In the negative electrode including the negative electrode active material with the large expansion and contraction such as silicon, too high adhesion between the binder and the negative electrode current collector causes the stress from the expansion and contraction of the negative electrode active material to be applied to the negative electrode current collector in the quick charging/discharging. This produces the irreversible form change of the negative electrode, i.e., a crease.

The quick charging/discharging in this specification refers to the charging and discharging at a current density of 10 C or more. Note that 1 C is the current value at which, when a battery cell with a nominal capacity is charged at a constant current, the charging is completed in an hour.

LIST OF CITATION

Patent Literature

PATENT LITERATURE 1: JP-A-2000-348730

SUMMARY OF THE INVENTION

Problems to be Solved

An object of the present invention is to provide a negative electrode for a lithium ion secondary battery, which has high energy density and which can suppress a crease (form change) of a negative electrode active material layer and a negative electrode current collector caused by the expansion and contraction occurring along with the quick charging and discharging and also suppress the falloff of the negative electrode active material layer from the negative electrode current collector after the quick charging and discharging cycle, and also provide a lithium ion secondary battery using the negative electrode.

Solution to the Problems

To solve the above problem, a negative electrode for a lithium ion secondary battery according to the present invention includes: a negative electrode active material including 5 wt % or more of silicon or silicon oxide; a binder that is a polyacrylate whose 1% or more of carboxylic groups at terminals of side chains of polyacrylic acid are cross-linked with magnesium or alkaline earth metal; and a negative electrode current collector.

According to the present invention, the adhesion to the negative electrode current collector can be adjusted by adjusting the amount of carboxylic groups at the terminals of the side chains of the polyacrylic acid. According to the present invention, the load by the in-plane stress on the negative electrode current collector caused by the expansion and contraction of the negative electrode active material in the quick charging and discharging can be relieved. This can suppress the generation of creases.

The three-dimensional coupling network of the binder is strengthened by the bond (—COO-M-OOC—: M is magnesium or alkaline earth metal) in which the carboxylic groups at the terminals of the side chains of the polyacrylic acid are cross-linked with magnesium or alkaline earth metal. Therefore, the binder, which is used for the negative electrode for a lithium ion secondary battery according to present invention, has high mechanical strength and has an effect of suppressing the expansion of the negative electrode active material layer. As a result, the stress applied to the negative electrode active material layer can be reduced. Further, the falloff of the negative electrode active material layer can be suppressed.

In the negative electrode for a lithium ion secondary battery according to the present invention, a cross-linking degree of the polyacrylate cross-linked with magnesium or alkaline earth metal is preferably 1 to 90% relative to the carboxylic groups included in the polyacrylic acid.

The above structure can relieve the adhesion between the negative electrode current collector and the negative electrode active material layer. The crease in the negative electrode current collector, which is generated by the expansion and contraction of the negative electrode active material layer in the quick charging and discharging, is suppressed.

If the cross-linking degree is 30 to 90%, the effect of suppressing the expansion of the negative electrode active material layer in the charging is more remarkable. The effect of suppressing the expansion reduces the stress in the negative electrode active material layer. This can improve the effect of suppressing the crease in the negative electrode current collector.

The average polymerization degree of the cross-linked polyacrylate is preferably 3,000 to 30,000.

In this structure, the falloff of the negative electrode active material from the negative electrode active material layer can be suppressed.

In particular, the cross-linked polyacrylate with an average polymerization degree of 6,500 to 30,000 provides the higher mechanical strength. In this case, even in the generation of the in-plane stress by the expansion and contraction of the negative electrode active material in the quick charging and discharging, the falloff of the active material can be further suppressed.

Effects of the Invention

According to the present invention, it is possible to provide a negative electrode for a lithium ion secondary battery, which can suppress the crease (form change) of the negative electrode active material layer and the negative electrode current collector caused by the expansion and contraction occurring along with the quick charging and discharging and also suppress the falloff of the negative electrode active material layer after the quick charging and discharging cycle.

BRIEF DESCRIPTION OF THE DRAWINGS

FIG. 1 is a sectional view illustrating a structure of a lithium ion secondary battery.

DESCRIPTION OF THE EMBODIMENT

A preferred embodiment of the present invention will be hereinafter described with reference to the drawings. The present invention is not limited to the embodiment below. The components described below include components that are easily conceived by a person skilled in the art and components substantially equivalent to the described components. Furthermore, the components to be described below can be combined with each other.

<Lithium Ion Secondary Battery>

FIG. 1 is a sectional view illustrating a structure of a lithium ion secondary battery 100. The lithium ion secondary battery 100 in FIG. 1 includes an exterior body 50, an electrode body 30 provided in the exterior body 50, and a nonaqueous electrolyte solution including an electrolyte. The electrode body 30 is formed by stacking a positive electrode 10 and a negative electrode 20 with a separator 18 interposed therebetween. The separator 18 holds the nonaqueous electrolyte solution serving as a medium for moving the lithium ions between the positive and negative electrodes in the charging and discharging.

The shape of the lithium ion secondary battery is not limited in particular. The shape may be, for example, a cylindrical shape, a rectangular shape, a coin-like shape, a flat shape, or a laminated film shape. The lithium ion secondary battery may have any of the above shapes. In the present invention, a laminated film is used as the exterior body 50. In the examples below, laminated film type batteries are evaluated. The laminated film has, for example, a three-layer structure in which polypropylene, aluminum, and nylon are stacked in this order.

(Positive Electrode for Lithium Ion Secondary Battery)

The positive electrode 10 is structured to have a positive electrode active material layer 14 including a positive electrode active material that intercalates or deintercalates lithium ions, a conductive auxiliary agent, and a binder such that the positive electrode active material layer 14 is provided on at least one main plane of a positive electrode current collector 12. The negative electrode 20 is structured to have a negative electrode active material layer 24 including a negative electrode active material that intercalates or deintercalates lithium ions, a conductive auxiliary agent, and a binder such that the negative electrode active material layer 24 is provided on at least one main plane of a negative electrode current collector 22.

(Negative Electrode for Lithium Ion Secondary Battery)

The negative electrode 20 used for the lithium ion secondary battery includes: the negative electrode active material including silicon or silicon oxide; a polyacrylate as the binder, in which the carboxylic groups at the terminals of the side chains of the polyacrylate are cross-linked with magnesium or alkaline earth metal; and the negative electrode current collector 22.

<Negative Electrode Active Material>

The negative electrode 20 can have high energy density by including silicon or silicon oxide as the negative electrode active material. Silicon may be present as elemental silicon, as an alloy or as a compound. Two or more kinds thereof may be mixed.

From the viewpoints of achieving higher energy density and a high effect of suppressing the crease in the negative electrode, the total weight of silicon and silicon oxide in the total weight of the negative electrode active material is preferably 5 wt % or more, more preferably 20 wt % or more, and much more preferably 40 wt % or more.

The silicon compound is specifically expressed by $M_y Si$ (M is one or more elements other than Si, and y is a numeral of 0 or more), such as $SiB_4$, $SiB_6$, $Mg_2Si$, $Ni_2Si$, $TiSi_2$, $MoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, and $ZnSi_2$.

Other examples of the silicon compound include a nitride compound and a carbide compound, such as SiC, $Si_3N_4$, $Si_2N_2O$, and LiSiO.

Silicon oxide is represented by $SiO_x$ ($0<x\leq2$), and the oxidation number can be freely selected. Silicon oxide may be present alone or present in the state that silicon oxide is compounded with silicon, silicon alloy, or a silicon compound.

The negative electrode active material may be combined with the negative electrode active material that intercalates or deintercalates lithium ions, other than silicon or silicon oxide. Examples thereof include graphite, soft carbon, hard carbon, $TiO_2$, $Li_4Ti_5O_{12}$, $Fe_2O_3$, and SnO.

<Cross-Linked Polyacrylate Binder>

The binder is added for the purpose of maintaining the electrode structure by having the members included in the negative electrode active material layer 24 adhere to each other or by having the negative electrode active material layer 24 and the negative electrode current collector 22 adhere to each other. The binder included in the negative electrode 20 for a lithium ion secondary battery may employ polyacrylic acid or the like.

The polyacrylic acid has a problem, however, that the adhesion to the negative electrode current collector 22 is too high. In general, when the negative electrode active material layer 24 and the negative electrode current collector 22 adhere to each other more closely, the negative electrode active material falls off less easily in the charging and discharging cycle and the deterioration is therefore suppressed. For this reason, the higher the adhesion is, the better. However, in the negative electrode including the negative electrode active material with large expansion and contraction such as silicon, the too high adhesion between the binder and the negative electrode current collector 22 causes the stress, which derives from the expansion and contraction in the negative electrode active material, to be applied to the negative electrode current collector 22 in the quick charging and discharging. Therefore, the irreversible form change of the negative electrode 20, i.e., a crease is generated.

In addition, the present inventors have conducted concerted studies to suppress the crease. Results of the studies have clarified that the adhesion can be adjusted by replacing the carboxylic group in the polyacrylic acid with alkali metal or the like to reduce the acidity of the polyacrylic acid. However, in the state that the negative electrode active material layer 24 and the negative electrode current collector 22 have the reduced adhesion, the mechanical strength of the alkali metal polyacrylate is not sufficient in the quick charging and discharging.

The carboxylic groups in the polyacrylic acid are cross-linked with magnesium or alkaline earth metal, which enables the negative electrode active material layer 24 to have higher mechanical strength while suppressing the acidity of the polyacrylic acid.

The three-dimensional coupling network is strengthened by the bond (—COO-M-OOC—), in which carboxylic groups at the terminals of the side chains of the polyacrylic acid are cross-linked with magnesium or alkaline earth metal. The mechanical strength thereof is higher than that of polyacrylic acid and the alkali metal polyacrylate. Thus, the effect of suppressing the expansion of the negative electrode active material layer 24 in the charging can be obtained. Therefore, the stress itself applied to the negative electrode active material layer 24 can be reduced. Moreover, the effect of suppressing the falloff of the negative electrode active material layer 24 after the quick charging and discharging can be improved.

The cross-linking degree of the polyacrylate cross-linked with magnesium or alkaline earth metal is preferably 1 to 90% relative to the carboxylic groups included in the polyacrylic acid. With the cross-linking degree in the above range, the separation of the applied film and the crease in the negative electrode after 10 cycles are suppressed.

Thus, the adhesion between the negative electrode current collector and the negative electrode active material layer is further relieved. The crease in the negative electrode current collector caused by the expansion and contraction of the negative electrode active material layer in the quick charging and discharging is suppressed.

In particular, the expansion of the negative electrode active material layer 24 is suppressed when the cross-linking degree is 30% or more. With the cross-linking degree less than or equal to 90%, the necessary and sufficient adhesion between the negative electrode current collector 22 and the negative electrode active material layer 24 can be maintained. Thus, the falloff of the negative electrode active material layer 24 can be suppressed.

The cross-linking degree refers to, in a predetermined amount of polyacrylic acid, the proportion of the carboxylic groups substituted by magnesium ions or alkaline earth metal ions among the carboxylic groups at the terminals of the side chains of polyacrylic acid.

For example, it is assumed that the polyacrylic acid with a molecular weight of 800,000 includes a monomer acrylic acid with a molecular weight of 72. Then, the number of carboxylic groups in the polyacrylic acid molecule structure is approximately 11,000. When all the hydrogen ions in approximately 11,000 carboxylic groups in the aforementioned molecular structure are replaced by magnesium ions or alkaline earth metal ions, the cross-linking degree is 100%. The magnesium ion and alkaline earth metal ion is divalent. Therefore, one magnesium ion or alkaline earth metal ion can react with two carboxylic groups. Thus, approximately 5,500 magnesium ions or alkaline earth metal ions are necessary to achieve a cross-linking degree of 100%.

The average polymerization degree of the cross-linked polyacrylate is preferably 3,000 to 30,000. With the average polymerization degree in this range, the necessary and sufficient elasticity and tensile strength can be achieved. The expansion of the negative electrode active material layer 24 can be suppressed.

In particular, the cross-linked polyacrylate with an average polymerization degree of 6,500 to 30,000 provides the higher mechanical strength. In this case, even in the generation of the in-plane stress by the expansion and contraction of the negative electrode active material in the quick charging and discharging, the falloff of the active material can be further suppressed.

When the cross-linked polyacrylate has an average polymerization degree of 30,000 or less, the negative electrode slurry including the negative electrode active material has the preferable viscosity. In this case, the dispersion and application of the negative electrode slurry composition are facilitated.

Within the range that does not deteriorate the mechanical strength of the cross-linked polyacrylic acid and the adjusted adhesion between the negative electrode active material layer and the negative electrode current collector, the cross-linked polyacrylic acid and the different kind of binder may be mixed. Examples of the different kind of binder include polyimide, polyamide, polyamide-imide, polyacrylonitrile, and polyalginic acid.

<Conductive Auxiliary Agent>

For the purpose of improving the conductivity, a conductive auxiliary agent may be added to the negative electrode active material layer 24 and the positive electrode active material layer 14. There is no particular limitation on the conductive auxiliary agent used in this embodiment. A known conductive auxiliary agent can be used. Examples thereof include carbon materials including carbon blacks such as acetylene black, furnace black, channel black, and thermal black, carbon fibers such as vapor growth carbon fiber (VGCF) and carbon nanotube, and graphite. Any one of these or two kinds of these can be used.

<Current Collector>

The negative electrode current collector 22 and the positive electrode current collector 12 are formed of a conductive material. One main surface or opposite surfaces thereof are provided with the negative electrode active material layer 24 and the positive electrode active material layer 14, respectively. There is no particular limitation on the material that forms the negative electrode current collector 22 for a lithium ion secondary battery in this embodiment. For the negative electrode current collector 22 used for the negative electrode 20, a metal foil of copper, stainless steel, nickel, titanium, an alloy thereof, or the like can be used. In particular, copper and a copper alloy are preferable. A foil made of an electrolytic copper foil or a rolled copper foil is preferably used. For the positive electrode current collector 12 used for the positive electrode 10, a metal foil of aluminum, stainless steel, nickel, titanium, an alloy thereof, or the like can be used. An aluminum foil is particularly preferable for the positive electrode current collector 12.

(Nonaqueous Electrolyte Solution)

The nonaqueous electrolyte solution is a nonaqueous electrolyte solution obtained by dissolving a lithium salt in a nonaqueous solvent (organic solvent). Examples of the lithium salt that can be used include $LiPF_6$, $LiClO_4$, $LiBF_4$, $LiAsF_6$, $LiCF_3SO_3$, $LiCF_3$, $CF_3SO_3$, $LiC(CF_3SO_2)_3$, $LiN(CF_3SO_2)_2$, $LiN(CF3CF_2SO_2)_2$, $LiN(CF_3SO_2)(C4F_9SO_2)$, $LiN(CF_3CF_2CO)_2$, and LiBOB, any of which may be used alone or in combination of two or more thereof.

Preferable examples of the organic solvent include propylene carbonate, ethylene carbonate, fluoroethylene carbonate, diethyl carbonate, dimethyl carbonate, and methylethyl carbonate. Any of these may be used alone or two or more of these may be mixed at any proportion and used. The organic solvent is preferably a mixture including a cyclic carbonate and a chained carbonate. From the viewpoint of the balance between the discharge capacity and the cycle characteristic, in particular, at least two of fluoroethylene carbonate and diethyl carbonate are preferably included.

(Separator)

The separator 18 is formed to have a porous structure with an electrically insulating property. Examples of the material for the separator 18 include a single-layer body or a multilayer body including a film formed of polyethylene, polypropylene, or polyolefin, a rolled film of a mixture including any of those resins, and a fiber nonwoven fabric formed of at least one kind selected from cellulose, polyester, and polypropylene.

<Method for Fabricating Lithium Ion Secondary Battery>

The lithium ion secondary battery 100 according to this embodiment is fabricated as below, for example.

First, the negative electrode 20 is fabricated as below. For example, the aforementioned negative electrode active material, the conductive auxiliary agent, and the polyacrylic acid binder are mixed and dispersed in a solvent such as water to fabricate a paste of negative electrode slurry. This negative electrode slurry with a predetermined thickness is applied to one surface or opposite surfaces of the negative electrode current collector 22 such as a copper foil using, for example, a comma roll coater. The solvent is vaporized in a dry furnace. In the case where the slurry is applied to the opposite surfaces of the negative electrode current collector 22, the applied film which serves as the negative electrode active material layer 24 and is formed on each surface preferably has the same thickness. The negative electrode active material layer 24 of the negative electrode 20 including the negative electrode active material is compressed onto one surface or opposite surfaces of the negative electrode current collector 22 using a roller pressing machine or the like. The adhesion between the negative electrode active material layer 24 on the negative electrode current collector 22 and the negative electrode current collector 22 can be increased and at the same time, a negative electrode sheet with predetermined density is obtained.

The negative electrode sheet is immersed into a diluted solution of a halide or a hydroxide of magnesium or alkaline earth metal whose concentration is adjusted to be certain concentration. This causes the chemical reaction in which the carboxylic groups at the terminals of the side chains of the polyacrylic acid are cross-linked with magnesium or alkaline earth metal. The polyacrylic acid binder can be made into polyacrylate binder cross-linked with magnesium or alkaline earth metal.

The negative electrode sheet is punched into a predetermined electrode size using an electrode mold, and accordingly, the negative electrode 20 for a lithium ion secondary battery in this embodiment can be obtained. The negative electrode 20 preferably has an area larger than the positive electrode 10. When the negative electrode 20 is larger than the positive electrode 10 on the opposite side, the short-circuiting which would occur by the precipitation of lithium can be suppressed.

The positive electrode 10 can be fabricated as below. For example, the aforementioned positive electrode active material, a conductive auxiliary agent, and a binder are mixed and dispersed in a solvent such as N-methyl-2-pyrolidone, thereby fabricating a paste of positive electrode slurry. The positive electrode active material layer 14 with a predetermined thickness is applied to one surface or opposite surfaces of the positive electrode current collector 12 such as a copper foil, using this positive electrode slurry and, for example, a comma roll coater. The solvent is vaporized in a dry furnace. In the case where the positive electrode active material layer is applied to the opposite surfaces of the positive electrode current collector 12, the applied film which serves as the positive electrode active material layer 14 and is formed on each surface preferably has the same thickness.

The positive electrode active material layer 14 of the positive electrode 10 is compressed onto one surface or opposite surfaces of the positive electrode current collector 12 using a roller pressing machine or the like. The adhesion between the positive electrode active material layer 14 and the positive electrode current collector 12 can be increased and a positive electrode sheet with predetermined density can be obtained.

The positive electrode sheet is punched into a predetermined electrode size using an electrode mold, and accordingly, the positive electrode 10 for a lithium ion secondary battery in this embodiment can be obtained. The positive electrode 10 preferably has an area smaller than the negative electrode 20 as described above. When the positive electrode 10 is a little smaller than the negative electrode 20 on the opposite side, the short-circuiting which would occur by the precipitation of lithium can be suppressed.

Next, the negative electrode 20 and the positive electrode 10 are stacked with the separator 18 interposed therebetween, thereby fabricating the electrode body 30. This serves as one layer of electrode body, and through the similar procedure, the electrode body including an arbitrary number of layers can be fabricated. The separator 18 is preferably a separator formed by being punched into a larger electrode size than both electrodes using an electrode mold to avoid the direct contact between the negative electrode 20 and the positive electrode 10.

Next, in the negative electrode 20 of the electrode body 30, a negative electrode lead 62 formed of nickel is attached to a projection end of the copper foil where the negative electrode active material layer 24 is not provided. On the other hand, in the positive electrode 10 of the electrode body 30, a positive electrode lead 60 formed of aluminum is attached using an ultrasonic welder to a projection end of the aluminum foil where the positive electrode active material layer 14 is not provided. Then, the electrode body 30 is inserted into the exterior body 50 from an aluminum laminated film. The periphery of the exterior body 50 is heat-sealed, while leaving one portion of the periphery open to serve as an opening. A predetermined amount of nonaqueous electrolyte solution is poured into the exterior body 50 and then the left-over one portion is heat-sealed while the pressure is reduced. Thus, the exterior body 50 is sealed. The lithium ion secondary battery 100 is thus obtained.

Charging the lithium ion secondary battery 100 causes, for example, lithium ions deintercalated from the positive electrode active material layer 14 to be intercalated in the negative electrode active material layer 24 through the nonaqueous electrolyte solution. Discharging the battery 100 causes, for example, lithium ions deintercalated from the negative electrode active material layer 24 to be intercalated in the positive electrode active material layer 14 through the nonaqueous electrolyte solution. In this manner, the lithium ion secondary battery 100 can accumulate electric capacity.

The present invention has been described in detail with reference to the embodiment. The present invention, however, is not limited to the above embodiment and various modifications can be made. For example, the lithium ion secondary battery with the laminated film structure has been described in the above embodiment, but the present invention is similarly applicable to the lithium ion secondary battery in which the positive electrode and the negative electrode are folded or stacked. Further, the present invention is suitably applicable to the lithium ion secondary battery with a coin-like shape, a rectangular shape, or a flat shape.

EXAMPLES

Example 1

<Fabrication of Negative Electrode for Lithium Ion Secondary Battery>

A paste of negative electrode slurry was fabricated by mixing and dispersing 60 wt % of SiO, which has been subjected to the disproportionation reaction in the thermal treatment at 1000° C. under reduced pressure, as the negative electrode active material, 20 wt % of acetylene black as the conductive auxiliary agent, 20 wt % of polyacrylic acid with an average polymerization degree of 11,000 as the binder, and water. Using a comma roll coater, this negative electrode slurry was applied to opposite surfaces of a 10-μm-thick copper foil to have a predetermined thickness, so that a uniform negative electrode active material layer was formed on each surface. Next, in a dry furnace, the negative electrode active material was dried at 100° C. in the air atmosphere. The film thickness of the negative electrode active material layer applied to each surface of the copper foil was adjusted to be substantially the same. Using a roll pressing machine, the negative electrode active material layer of the negative electrode including the negative electrode active material was crimped on each surface of the negative electrode current collector, thereby fabricating the negative electrode sheet with predetermined density. After that, this negative electrode sheet was immersed in 5 wt % of a magnesium chloride aqueous solution for five minutes. Thus, magnesium polyacrylate with an average polymerization degree of 11,000 was obtained as the cross-linked polyacrylic acid binder with a cross-linking degree of 30%.

The negative electrode sheet was punched into an electrode size of 21×31 mm using an electrode mold, and then dried with hot air in a thermal process furnace. Thus, the negative electrode for a lithium ion secondary battery according to Example 1 was fabricated. The thermal process was performed in vacuum.

<Fabrication of Positive Electrode for Lithium Ion Secondary Battery>

A paste of positive electrode slurry was fabricated by mixing and dispersing 96 wt % of lithium cobaltate ($LiCoO_2$) as the positive electrode active material, 2 wt % of Ketjen black as the conductive auxiliary agent, 2 wt % of PVDF as the binder, and N-methyl-2-pyrrolidone as the solvent. Using a comma roll coater, this positive electrode slurry was applied to opposite surfaces of a 20-μm-thick aluminum foil to have a predetermined thickness, so that a uniform positive electrode active material layer was formed on each surface. Next, in a dry furnace, the N-methyl-2-pyrrolidone solvent in the positive electrode active material was dried at 110° C. in the air atmosphere. The film thickness of the positive electrode active material layer applied to each surface of the aluminum foil was adjusted to be substantially the same. Using a roll pressing machine, the positive electrode active material layer of the positive electrode including the positive electrode active material was compressed on each surface of the positive electrode current collector, thereby fabricating the positive electrode sheet with predetermined density.

The positive electrode sheet was punched into an electrode size of 20×30 mm using an electrode mold, thereby fabricating the positive electrode for the lithium ion secondary battery.

<Fabrication of Lithium Ion Secondary Battery>

The negative electrode and the positive electrode fabricated as above were stacked with a separator made of polypropylene with a thickness of 16 μm and a size of 22×33 mm interposed therebetween, thereby fabricating the electrode body. Three negative electrodes and two positive electrodes were stacked alternately with four separators interposed therebetween. In the negative electrode of the electrode body, a projection end of the copper foil where the negative electrode active material layer was not formed was provided with a negative electrode lead formed of nickel. On the other hand, in the positive electrode of the electrode body, a projection end of the aluminum foil where the positive electrode active material layer was not formed was provided with a positive electrode lead formed of aluminum by an ultrasonic welder. This electrode body was inserted into the exterior body of the aluminum laminated film. The periphery of the exterior body was heat-sealed while leaving one portion of the periphery open to serves as the opening. Into the exterior body, a nonaqueous electrolyte solution was poured. The nonaqueous electrolyte solution was prepared by adding 1 M (mol/L) of $LiPF_6$ as a lithium salt to a solvent containing EC/DEC at 3:7. After that, the left-over one portion was heat-sealed by a vacuum sealer while the pressure was reduced. Thus, the lithium ion secondary battery according to Example 1 was fabricated.

Example 2

A negative electrode for a lithium ion secondary battery and a lithium ion secondary battery according to Example 2 were fabricated through the same procedure as that in Example 1 except that the negative electrode sheet was immersed in 5 wt % of a magnesium chloride aqueous solution for 10 minutes, thereby providing magnesium polyacrylate with an average polymerization degree of 11,000 as the cross-linked binder with a cross-linking degree of 60%.

Example 3

A negative electrode for a lithium ion secondary battery and a lithium ion secondary battery according to Example 3 were fabricated through the same procedure as that in Example 1 except that the negative electrode sheet was immersed in 5 wt % of a magnesium chloride aqueous solution for 15 minutes, thereby providing magnesium polyacrylate with an average polymerization degree of 11,000 as the cross-linked binder with a cross-linking degree of 90%.

Example 4

A negative electrode for a lithium ion secondary battery and a lithium ion secondary battery according to Example 4 were fabricated through the same procedure as that in Example 1 except that the negative electrode sheet was immersed in 5 wt % of a calcium chloride aqueous solution for 3 minutes, thereby providing calcium polyacrylate with an average polymerization degree of 11,000 as the cross-linked binder with a cross-linking degree of 20%.

Example 5

A negative electrode for a lithium ion secondary battery and a lithium ion secondary battery according to Example 5 were fabricated through the same procedure as that in Example 1 except that the negative electrode sheet was immersed in 5 wt % of a calcium chloride aqueous solution for 5 minutes, thereby providing calcium polyacrylate with an average polymerization degree of 11,000 as the cross-linked binder with a cross-linking degree of 30%.

Example 6

A negative electrode for a lithium ion secondary battery and a lithium ion secondary battery according to Example 6 were fabricated through the same procedure as that in Example 1 except that the negative electrode sheet was immersed in 5 wt % of a calcium chloride aqueous solution for 10 minutes, thereby providing calcium polyacrylate with an average polymerization degree of 11,000 as the cross-linked binder with a cross-linking degree of 60%.

Example 7

A negative electrode for a lithium ion secondary battery and a lithium ion secondary battery according to Example 7 were fabricated through the same procedure as that in Example 1 except that the negative electrode sheet was immersed in 5 wt % of a calcium chloride aqueous solution for 15 minutes, thereby providing calcium polyacrylate with an average polymerization degree of 11,000 as the cross-linked binder with a cross-linking degree of 90%.

Example 8

A negative electrode for a lithium ion secondary battery and a lithium ion secondary battery according to Example 8 were fabricated through the same procedure as that in Example 1 except that the negative electrode sheet was immersed in 5 wt % of a calcium chloride aqueous solution for 20 minutes, thereby providing calcium polyacrylate with an average polymerization degree of 11,000 as the cross-linked binder with a cross-linking degree of 100%.

Example 9

A negative electrode for a lithium ion secondary battery and a lithium ion secondary battery according to Example 9 were fabricated through the same procedure as that in Example 1 except that the negative electrode sheet was immersed in 5 wt % of a barium chloride aqueous solution for 5 minutes, thereby providing barium polyacrylate with an average polymerization degree of 11,000 as the cross-linked binder with a cross-linking degree of 20%.

Example 10

A negative electrode for a lithium ion secondary battery and a lithium ion secondary battery according to Example 10 were fabricated through the same procedure as that in Example 1 except that the negative electrode sheet was immersed in 5 wt % of a barium chloride aqueous solution for 8 minutes, thereby providing barium polyacrylate with an average polymerization degree of 11,000 as the cross-linked binder with a cross-linking degree of 30%.

Example 11

A negative electrode for a lithium ion secondary battery and a lithium ion secondary battery according to Example 11 were fabricated through the same procedure as that in Example 1 except that the negative electrode sheet was immersed in 5 wt % of a barium chloride aqueous solution for 20 minutes, thereby providing barium polyacrylate with an average polymerization degree of 11,000 as the cross-linked binder with a cross-linking degree of 60%.

Example 12

A negative electrode for a lithium ion secondary battery and a lithium ion secondary battery according to Example 12 were fabricated through the same procedure as that in Example 1 except that the negative electrode sheet was immersed in 5 wt % of a barium chloride aqueous solution for 30 minutes, thereby providing barium polyacrylate with an average polymerization degree of 11,000 as the cross-linked binder with a cross-linking degree of 90%.

Example 13

A negative electrode for a lithium ion secondary battery and a lithium ion secondary battery according to Example 13 were fabricated through the same procedure as that in Example 1 except that the binder in the fabrication of the negative electrode slurry was polyacrylic acid with an average polymerization degree of 6,500 and that the negative electrode sheet formed of the negative electrode slurry was immersed with 5 wt % of a calcium chloride aqueous solution for 7 minutes, thereby providing calcium polyacrylate with an average polymerization degree of 6,500 as the cross-linked binder with a cross-linking degree of 60%.

Example 14

A negative electrode for a lithium ion secondary battery and a lithium ion secondary battery according to Example 14 were fabricated through the same procedure as that in Example 1 except that the binder in the fabrication of the negative electrode slurry was polyacrylic acid with an average polymerization degree of 30,000 and that the negative electrode sheet formed of the negative electrode slurry was immersed with 5 wt % of a calcium chloride aqueous solution for 20 minutes, thereby providing calcium polyacrylate with an average polymerization degree of 30,000 as the cross-linked binder with a cross-linking degree of 60%.

Example 15

A negative electrode for a lithium ion secondary battery and a lithium ion secondary battery according to Example 15 were fabricated through the same procedure as that in Example 1 except that the binder in the fabrication of the negative electrode slurry was polyacrylic acid with an average polymerization degree of 3,000 and that the negative electrode sheet formed of the negative electrode slurry was immersed with 5 wt % of a calcium chloride aqueous solution for 4 minutes, thereby providing calcium polyacrylate with an average polymerization degree of 3,000 as the cross-linked binder with a cross-linking degree of 30%.

Example 16

A negative electrode for a lithium ion secondary battery and a lithium ion secondary battery according to Example 16 were fabricated through the same procedure as that in Example 15 except that the negative electrode sheet was immersed in 5 wt % of a calcium chloride aqueous solution for 8 minutes, thereby providing calcium polyacrylate with an average polymerization degree of 3,000 as the cross-linked binder with a cross-linking degree of 60%.

Example 17

A negative electrode for a lithium ion secondary battery and a lithium ion secondary battery according to Example 17 were fabricated through the same procedure as that in Example 15 except that the negative electrode sheet was immersed in 5 wt % of a calcium chloride aqueous solution for 12 minutes, thereby providing calcium polyacrylate with an average polymerization degree of 3,000 as the cross-linked binder with a cross-linking degree of 90%.

Example 18

A negative electrode for a lithium ion secondary battery and a lithium ion secondary battery according to Example 18 were fabricated through the same procedure as that in Example 1 except that the negative electrode sheet was immersed in 5 wt % of a strontium hydroxide aqueous solution for 15 minutes, thereby providing strontium polyacrylate with an average polymerization degree of 11,000 as the cross-linked binder with a cross-linking degree of 60%.

Example 19

A negative electrode for a lithium ion secondary battery and a lithium ion secondary battery according to Example 19 were fabricated through the same procedure as that in Example 1 except that the negative electrode sheet was immersed in 5 wt % of a radium hydroxide aqueous solution for 15 minutes, thereby providing radium polyacrylate with an average polymerization degree of 11,000 as the cross-linked binder with a cross-linking degree of 60%.

Example 20

SiO subjected to the disproportionation reaction in the thermal treatment at 1000° C. under reduced pressure was used as the negative electrode active material. Water, 60 wt % of the negative electrode active material, 20 wt % of acetylene black as the conductive auxiliary agent, and 20 wt % of calcium polyacrylate as the binder were mixed and dispersed to provide a paste of negative electrode slurry. Calcium polyacrylate was obtained by cross-linking 1% of carboxylic groups of the polyacrylic acid. The cross-linking was performed by neutralization between the polyacrylic acid with an average polymerization degree of 11,000 and a predetermined amount of calcium hydroxide. After that, the applying, drying, and rolling steps were performed under the same condition as that of Example 1, thereby fabricating the negative electrode for a lithium ion secondary battery. The other steps, which were the same as those of Example 1, were performed to fabricate the lithium ion secondary battery.

Example 21

A negative electrode for a lithium ion secondary battery and a lithium ion secondary battery according to Example 21 were fabricated through the same procedure as that in Example 1 except that the negative electrode sheet was immersed in 5 wt % of a magnesium chloride aqueous solution for 10 seconds, thereby providing magnesium polyacrylate with an average polymerization degree of 11,000 as the cross-linked binder with a cross-linking degree of 1%.

Example 22

A negative electrode for a lithium ion secondary battery and a lithium ion secondary battery according to Example 22 were fabricated through the same procedure as that in Example 1 except that the negative electrode sheet was immersed in 5 wt % of a barium chloride aqueous solution for 15 seconds, thereby providing barium polyacrylate with an average polymerization degree of 11,000 as the cross-linked binder with a cross-linking degree of 1%.

Example 23

A negative electrode for a lithium ion secondary battery and a lithium ion secondary battery according to Example 23 were fabricated through the same procedure as that in Example 1 except that the negative electrode sheet was immersed in 5 wt % of a strontium hydroxide aqueous solution for 8 minutes, thereby providing strontium polyacrylate with an average polymerization degree of 11,000 as the cross-linked binder with a cross-linking degree of 30%.

Example 24

A negative electrode for a lithium ion secondary battery and a lithium ion secondary battery according to Example 24 were fabricated through the same procedure as that in Example 1 except that the negative electrode sheet was immersed in 5 wt % of a strontium hydroxide aqueous solution for 23 minutes, thereby providing strontium polyacrylate with an average polymerization degree of 11,000 as the cross-linked binder with a cross-linking degree of 90%.

Example 25

A negative electrode for a lithium ion secondary battery and a lithium ion secondary battery according to Example 25 were fabricated through the same procedure as that in Example 1 except that the negative electrode sheet was immersed in 5 wt % of a radium hydroxide aqueous solution for 8 minutes, thereby providing radium polyacrylate with an average polymerization degree of 11,000 as the cross-linked binder with a cross-linking degree of 30%.

Example 26

A negative electrode for a lithium ion secondary battery and a lithium ion secondary battery according to Example 26 were fabricated through the same procedure as that in Example 1 except that the negative electrode sheet was immersed in 5 wt % of a radium hydroxide aqueous solution for 23 minutes, thereby providing radium polyacrylate with an average polymerization degree of 11,000 as the cross-linked binder with a cross-linking degree of 90%.

Example 27

A negative electrode for a lithium ion secondary battery and a lithium ion secondary battery according to Example 27 were fabricated through the same procedure as that in Example 20 except that the negative electrode active material contained SiO by 80 wt % and contained graphite by 20 wt %.

Example 28

A negative electrode for a lithium ion secondary battery and a lithium ion secondary battery according to Example 28 were fabricated through the same procedure as that in Example 20 except that the negative electrode active material contained SiO by 60 wt % and contained graphite by 40 wt %.

Example 29

A negative electrode for a lithium ion secondary battery and a lithium ion secondary battery according to Example 29 were fabricated through the same procedure as that in Example 20 except that the negative electrode active material contained SiO by 40 wt % and contained graphite by 60 wt %.

Example 30

A negative electrode for a lithium ion secondary battery and a lithium ion secondary battery according to Example 30 were fabricated through the same procedure as that in Example 20 except that the negative electrode active material contained SiO by 20 wt % and contained graphite by 80 wt %.

Example 31

A negative electrode for a lithium ion secondary battery and a lithium ion secondary battery according to Example 31 were fabricated through the same procedure as that in Example 20 except that the negative electrode active material contained SiO by 10 wt % and contained graphite by 90 wt %.

Example 32

A negative electrode for a lithium ion secondary battery and a lithium ion secondary battery according to Example 32 were fabricated through the same procedure as that in Example 20 except that the negative electrode active material contained SiO by 5 wt % and contained graphite by 95 wt %.

Comparative Example 1

A negative electrode for a lithium ion secondary battery and a lithium ion secondary battery according to Comparative Example 1 were fabricated through the same procedure as that in Example 1 except that the binder is the polyacrylic acid with an average polymerization degree of 11,000 that has not been subjected to cross-linking.

Comparative Example 2

A negative electrode for a lithium ion secondary battery and a lithium ion secondary battery according to Comparative Example 2 were fabricated through the same procedure as that in Example 1 except that the binder is sodium polyacrylate with an average polymerization degree of 11,000. Sodium polyacrylate according to Comparative Example 2 was obtained by neutralizing the carboxylic groups of the polyacrylic acid used in Example 1 with sodium hydroxide by 30% of the carboxylic groups.

Comparative Example 3

A negative electrode for a lithium ion secondary battery and a lithium ion secondary battery according to Comparative Example 3 were fabricated through the same procedure as that in Example 1 except that the binder is sodium polyacrylate with an average polymerization degree of 11,000. Sodium polyacrylate according to Comparative Example 3 was obtained by neutralizing the carboxylic groups of the polyacrylic acid used in Example 1 with sodium hydroxide by 60% of the carboxylic groups.

Comparative Example 4

A negative electrode for a lithium ion secondary battery and a lithium ion secondary battery according to Comparative Example 4 were fabricated through the same procedure as that in Example 1 except that the binder is sodium polyacrylate with an average polymerization degree of 11,000. Sodium polyacrylate according to Comparative Example 4 was obtained by neutralizing the carboxylic groups of the polyacrylic acid used in Example 1 with sodium hydroxide by 90% of the carboxylic groups.

Comparative Example 5

A negative electrode for a lithium ion secondary battery and a lithium ion secondary battery according to Comparative Example 5 were fabricated through the same procedure as that in Example 1 except that the negative electrode sheet was immersed in 5 wt % of a zinc hydroxide aqueous solution, which was dissolved in a dilute acetic acid aqueous solution, for 15 minutes, thereby providing zinc polyacrylate with an average polymerization degree of 11,000 as the cross-linked binder with a cross-linking degree of 30%.

Comparative Example 6

A negative electrode for a lithium ion secondary battery and a lithium ion secondary battery according to Comparative Example 6 were fabricated through the same procedure as that in Example 1 except that the negative electrode sheet was immersed in 5 wt % of a zinc hydroxide aqueous solution, which was dissolved in a dilute acetic acid aqueous solution, for 30 minutes, thereby providing zinc polyacrylate with an average polymerization degree of 11,000 as the cross-linked binder with a cross-linking degree of 60%.

Comparative Example 7

A negative electrode for a lithium ion secondary battery and a lithium ion secondary battery according to Comparative Example 7 were fabricated through the same procedure as that in Comparative Example 1 except that the negative electrode active material contained SiO by 80 wt % and contained graphite by 20 wt %.

Comparative Example 8

A negative electrode for a lithium ion secondary battery and a lithium ion secondary battery according to Comparative Example 8 were fabricated through the same procedure as that in Comparative Example 1 except that the negative electrode active material contained SiO by 60 wt % and contained graphite by 40 wt %.

Comparative Example 9

A negative electrode for a lithium ion secondary battery and a lithium ion secondary battery according to Comparative Example 9 were fabricated through the same procedure as that in Comparative Example 1 except that the negative electrode active material contained SiO by 40 wt % and contained graphite by 60 wt %.

Comparative Example 10

A negative electrode for a lithium ion secondary battery and a lithium ion secondary battery according to Comparative Example 10 were fabricated through the same procedure as that in Comparative Example 1 except that the negative electrode active material contained SiO by 20 wt % and contained graphite by 80 wt %.

Comparative Example 11

A negative electrode for a lithium ion secondary battery and a lithium ion secondary battery according to Comparative Example 11 were fabricated through the same procedure as that in Comparative Example 1 except that the negative electrode active material contained SiO by 10 wt % and contained graphite by 90 wt %.

Comparative Example 12

A negative electrode for a lithium ion secondary battery and a lithium ion secondary battery according to Comparative Example 12 were fabricated through the same procedure as that in Comparative Example 1 except that the negative electrode active material contained SiO by 5 wt % and contained graphite by 95 wt %.

Comparative Example 13

A negative electrode for a lithium ion secondary battery and a lithium ion secondary battery according to Comparative Example 13 were fabricated through the same procedure as that in Comparative Example 1 except that the negative electrode active material was graphite.

Comparative Example 14

A negative electrode for a lithium ion secondary battery and a lithium ion secondary battery according to Comparative Example 14 were fabricated through the same procedure as that in Example 20 except that the negative electrode active material was graphite.

<Evaluation>

The negative electrodes for a lithium ion secondary battery and the lithium ion secondary batteries according to Examples 1 to 26 and Comparative Examples 1 to 6 were evaluated in regard to the separation strength between the negative electrode active material layer and the negative electrode current collector, the expansion rate in the negative electrode thickness direction in the initial charging, and the presence or absence of a crease and the presence or absence of the separation of applied film in the 10-th quick charging and discharging cycle.

(Separation Test)

The adhesion between the negative electrode current collector and the negative electrode active material layer included in the negative electrode for a lithium ion secondary battery was evaluated using a compact table-top tensile tester Ez-TEST (manufactured by Shimadzu Corporation). The load cell was a jig for 20 N.

First, the negative electrode for a lithium ion secondary battery according to any of Examples and Comparative Examples was cut into a size of 30 mm×15 mm. This electrode was used as a negative electrode test piece. Next, the double-sided bonding tape manufactured by Sumitomo 3M Limited was attached to a pedestal of a smooth stainless steel plate. The cut negative electrode test piece was attached onto this double-sided bonding tape while preventing the air from entering between the tape and the piece. On this occasion, the surface of the active material layer of the negative electrode test piece and the double-sided bonding tape are attached to each other. In the attachment, a part of the negative electrode test piece (by approximately 5 mm from an end) was folded up by 90° and the folded part can serve as a pinch portion.

The pinch portion of the negative electrode test piece was pinched by a pinching tool and pulled up vertically at a speed of 100 mm/min, so that the negative electrode active material layer of the negative electrode test piece was separated from the negative electrode current collector. The separation strength was calculated by the formula below.

Separation strength (mN/mm)=separation stress (mN)/width of negative electrode test piece (mm)

(Measurement of Expansion Rate of Negative Electrode in Initial Charging)

The lithium ion secondary batteries according to Examples and Comparative Examples were charged under the charging and discharging conditions below. The expansion rate of the negative electrode in the initial charging was evaluated. The charging was carried out at 25° C. at a constant current of 10 C until a voltage of 4.2 V was attained. The lithium ion secondary battery in the charged state was disassembled. After the negative electrode was extracted, the thickness of the negative electrode at six points was measured with a micrometer. By comparing the calculated average value and the thickness of the negative electrode before the charging, the expansion rate was calculated.

For example, the expansion rate of the negative electrode in the initial charging is defined by the formula below.

Expansion rate of negative electrode in initial charging (%)=(thickness of negative electrode in initially charged state/thickness of negative electrode before charging)×100(%)

(Observation of Form of Negative Electrode in 10-th Cycle in Charging and Discharging Test)

The lithium ion secondary batteries according to Examples and Comparative Examples were charged and discharged repeatedly under the charging and discharging conditions described below. After that, each lithium ion secondary battery was disassembled. The form of the negative electrode in the 10-th charging and discharging cycle was visually observed. The presence or absence of a crease of the negative electrode and the presence or absence of the separation of the applied film were visually evaluated. The charging and discharging were carried out at 25° C. In the charging and discharging test, one cycle includes a constant-current charging at a constant current of 10 C until 4.2 V and the subsequent discharging at a constant current of 10 C until a battery voltage of 2.5 V.

Table 1 shows the results of the separation strength between the negative electrode current collector and the negative electrode active material layer, the observed form of separation, the expansion rate in the negative electrode thickness direction in the initial charging, and the presence or absence of a crease and the presence or absence of the separation of the applied film in the negative electrode in the 10-th charging and discharging cycle in the negative electrodes for a lithium ion secondary battery and the lithium ion secondary batteries according to Examples 1 to 26 and Comparative Examples 1 to 6.

TABLE 1

| | Binder | Neutralized carboxylic groups (%) | Cross-linking degree [%] | Polymerization degree of binder | Separation strength [mN/cm] | Expansion rate of negative electrode in charging | Crease in negative electrode after 10 cycles | Separation of applied film after 10 cycles |
|---|---|---|---|---|---|---|---|---|
| Example 1 | magnesium polyacrylate | 30 | 30 | 11000 | 179 | 109% | None | None |
| Example 2 | magnesium polyacrylate | 60 | 60 | 11000 | 165 | 108% | None | None |
| Example 3 | magnesium polyacrylate | 90 | 90 | 11000 | 141 | 106% | None | None |
| Example 4 | calcium polyacrylate | 20 | 20 | 11000 | 201 | 118% | Almost none | None |
| Example 5 | calcium polyacrylate | 30 | 30 | 11000 | 172 | 107% | None | None |
| Example 6 | calcium polyacrylate | 60 | 60 | 11000 | 162 | 106% | None | None |
| Example 7 | calcium polyacrylate | 90 | 90 | 11000 | 140 | 104% | None | None |
| Example 8 | calcium polyacrylate | 100 | 100 | 11000 | 70 | 102% | None | Almost none |
| Example 9 | barium polyacrylate | 20 | 20 | 11000 | 197 | 118% | Almost none | None |
| Example 10 | barium polyacrylate | 30 | 30 | 11000 | 168 | 108% | None | None |
| Example 11 | barium polyacrylate | 60 | 60 | 11000 | 155 | 106% | None | None |
| Example 12 | barium polyacrylate | 90 | 90 | 11000 | 152 | 106% | None | None |
| Example 13 | calcium polyacrylate | 60 | 60 | 6500 | 156 | 109% | None | None |
| Example 14 | calcium polyacrylate | 60 | 60 | 30000 | 201 | 103% | None | None |
| Example 15 | calcium polyacrylate | 30 | 30 | 3000 | 84 | 128% | None | Almost none |
| Example 16 | calcium polyacrylate | 60 | 60 | 3000 | 52 | 125% | None | Almost none |
| Example 17 | calcium polyacrylate | 90 | 90 | 3000 | 46 | 125% | None | Almost none |
| Example 18 | strontium polyacrylate | 60 | 60 | 11000 | 174 | 106% | None | None |
| Example 19 | radium polyacrylate | 60 | 60 | 11000 | 172 | 106% | None | None |
| Example 20 | calcium polyacrylate | 1 | 1 | 11000 | 213 | 133% | Almost none | None |
| Example 21 | magnesium polyacrylate | 1 | 1 | 11000 | 215 | 127% | Almost none | None |
| Example 22 | barium polyacrylate | 1 | 1 | 11000 | 202 | 130% | Almost none | None |
| Example 23 | strontium polyacrylate | 30 | 30 | 11000 | 187 | 107% | None | None |
| Example 24 | strontium polyacrylate | 90 | 90 | 11000 | 151 | 104% | None | None |
| Example 25 | radium polyacrylate | 30 | 30 | 11000 | 183 | 108% | None | None |
| Example 26 | radium polyacrylate | 90 | 90 | 11000 | 146 | 105% | None | None |

TABLE 1-continued

| | Binder | Neutralized carboxylic groups (%) | Cross-linking degree [%] | Polymerization degree of binder | Separation strength [mN/cm] | Expansion rate of negative electrode in charging | Crease in negative electrode after 10 cycles | Separation of applied film after 10 cycles |
|---|---|---|---|---|---|---|---|---|
| Comparative Example 1 | polyacrylic acid | 0 | — | 11000 | 218 | 158% | None | None |
| Comparative Example 2 | sodium polyacrylate | 30 | — | 11000 | 153 | 155% | None | None |
| Comparative Example 3 | sodium polyacrylate | 60 | — | 11000 | 120 | 153% | None | Observed |
| Comparative Example 4 | sodium polyacrylate | 90 | — | 11000 | 81 | 148% | None | Observed |
| Comparative Example 5 | zinc polyacrylate | 30 | 30 | 11000 | 150 | 115% | Almost none | Observed |
| Comparative Example 6 | zinc polyacrylate | 60 | 60 | 11000 | 123 | 112% | Almost none | Observed |

As is clear from Table 1, it has been understood that the crease and the separation of the applied film after 10 cycles can be suppressed because 1% or more of the carboxylic groups at the terminals of the side chains of the polyacrylic acid in the polyacrylate binder are cross-linked with magnesium or alkaline earth metal. Further, it has been clarified that the effect of suppressing the crease and the separation of the applied film in the negative electrode after the charging and discharging cycles can be favorably improved when the polyacrylate binder cross-linked with magnesium or alkaline earth metal has a cross-linking degree of 1 to 90% and has an average polymerization degree of 3,000 to 30,000.

"Almost no crease" of the negative electrode after 10 cycles means "a crease to the extent that the negative electrode is very slightly buckled up" rather than "a clear crease of the negative electrode." Likewise, "almost no separation" of the applied film after 10 cycles means "a separation to the extent that a part of the negative electrode active material layer is separated at the end or at the four corners of the negative electrode" rather than "a clear separation of the negative electrode active material layer."

In each of Comparative Examples 1 to 6, at least any one of the expansion of the electrode, the crease in the electrode, and the separation after the charging and discharging cycle in the negative electrode for a lithium ion secondary battery had a problem.

It has been confirmed that, in the zinc polyacrylate cross-linked with zinc prepared in Comparative Examples 5 and 6, the negative electrode active material layer was separated from the negative electrode current collector because the binder was partly dissolved. It is considered that this is because zinc polyacrylate has low resistance against the electrolyte solution or the reduction.

In addition, the negative electrodes for a lithium ion secondary battery and the lithium ion secondary batteries according to Example 20, Examples 27 to 32 and Comparative Example 1 and Comparative Examples 7 to 14 were evaluated by the same procedure as that described above in regard to the expansion rate in the negative electrode thickness direction in the initial charging, and the presence or absence of a crease and the presence or absence of the separation of the applied film in the negative electrode in the 10-th quick charging and discharging cycle.

Table 2 shows the results of the separation strength between the negative electrode current collector and the negative electrode active material layer, the observed form of separation, the expansion rate in the negative electrode thickness direction in the initial charging, and the presence or absence of a crease and the presence or absence of the separation of the applied film in the negative electrode in the 10-th charging and discharging cycle in the negative electrodes for a lithium ion secondary battery and the lithium ion secondary batteries according to Example 20, Examples 27 to 32 and Comparative Example 1 and Comparative Examples 7 to 14.

TABLE 2

| | binder | Neutralized carboxylic group [%] | Cross-linking degree [%] | Polymerization degree of binder | Content of SiO | Energy density of negative electrode [mAh/g] | Separation strength [mN/cm] | Expansion rate of negative electrode in charging | Crease in negative electrode after 10 cycles | Separation of applied film after 10 cycles |
|---|---|---|---|---|---|---|---|---|---|---|
| Example 20 | calcium polyacrylate | 1 | 1 | 11000 | 100% | 2060 | 217 | 133% | Almost none | None |
| Example 27 | calcium polyacrylate | 1 | 1 | 11000 | 80% | 1721 | 211 | 131% | Almost none | None |
| Example 28 | calcium polyacrylate | 1 | 1 | 11000 | 60% | 1382 | 193 | 130% | Almost none | None |
| Example 29 | calcium polyacrylate | 1 | 1 | 11000 | 40% | 1044 | 171 | 125% | Almost none | None |
| Example 30 | calcium polyacrylate | 1 | 1 | 11000 | 20% | 705 | 148 | 117% | Almost none | None |
| Example 31 | calcium polyacrylate | 1 | 1 | 11000 | 10% | 535 | 132 | 114% | Almost none | None |

TABLE 2-continued

|  | binder | Neutralized carboxylic group [%] | Cross-linking degree [%] | Polymerization degree of binder | Content of SiO | Energy density of negative electrode [mAh/g] | Separation strength [mN/cm] | Expansion rate of negative electrode in charging | Crease in negative electrode after 10 cycles | Separation of applied film after 10 cycles |
|---|---|---|---|---|---|---|---|---|---|---|
| Example 32 | calcium polyacrylate | 1 | 1 | 11000 | 5% | 451 | 126 | 107% | None | Almost none |
| Comparative Example 1 | polyacrylic acid | — | — | 11000 | 100% | 2060 | 218 | 158% | Observed | None |
| Comparative Example 7 | polyacrylic acid | — | — | 11000 | 80% | 1721 | 213 | 147% | Observed | None |
| Comparative Example 8 | polyacrylic acid | — | — | 11000 | 60% | 1382 | 195 | 135% | Observed | None |
| Comparative Example 9 | polyacrylic acid | — | — | 11000 | 40% | 1044 | 174 | 128% | Observed | None |
| Comparative Example 10 | polyacrylic acid | — | — | 11000 | 20% | 705 | 173 | 119% | Observed | None |
| Comparative Example 11 | polyacrylic acid | — | — | 11000 | 10% | 535 | 161 | 115% | Observed | None |
| Comparative Example 12 | polyacrylic acid | — | — | 11000 | 5% | 451 | 158 | 108% | Observed | Observed |
| Comparative Example 13 | polyacrylic acid | — | — | 11000 | 0% | 366 | 106 | 103% | None | Observed |
| Comparative Example 14 | calcium polyacrylate | 1 | 1 | 11000 | 0% | 366 | 117 | 103% | None | Observed |

As is clear from Table 2, it has been understood that the effect of suppressing the expansion of the negative electrode was obtained by calcium polyacrylate when silicon oxide was contained by 5% or more. In the lithium ion secondary batteries according to Comparative Example 1 and Comparative Examples 7 to 12, the crease in the negative electrode was observed when SiO was contained by 5 wt % or more and 20 wt % or less. In addition, it has been confirmed that as SiO was contained more, the crease in the negative electrode after 10 quick charging and discharging cycles became more remarkable. On the other hand, in the lithium ion secondary batteries according to Example 20 and Examples 27 to 32, the effect of suppressing the expansion of the negative electrode was exhibited when silicon oxide was contained by 5% or more. Moreover, it has been clarified that the crease after the 10 quick charging and discharging cycles can be suppressed. The effect of suppressing the creases in the negative electrode was remarkably observed when SiO was contained by 40 wt % or more.

In the lithium ion secondary batteries according to Comparative Examples 13 and 14, the separation of the negative electrode active material layer was observed after 10 quick charging and discharging cycles. Moreover, it has been confirmed that more SiO was contained, the separation strength was increased. It is presumed that this tendency is based on the anchor effect by the rolling because SiO particles are harder than graphite particles. That is to say, it is necessary that SiO is contained by 5 wt % or more.

Moreover, the results from Table 2 have clarified that the effect of suppressing the crease in the negative electrode can be obtained even if the cross-linking degree of polyacrylic acid is 1%.

The invention claimed is:

1. A negative electrode for a lithium ion secondary battery, comprising:
a negative electrode active material including 5 wt % or more of at least one silicon component selected from the group consisting of silicon oxide, elemental silicon, an alloy of silicon, and a compound of silicon other than silicon oxide;
a binder that is a polyacrylate obtained by a reaction of a polyacrylic acid and magnesium, an alkaline earth metal, a compound of magnesium, or a compound of an alkaline earth metal, and whose 1% or more of carboxylic groups at terminals of side chains of the polyacrylic acid are cross-linked with magnesium or alkaline earth metal; and
a negative electrode current collector.

2. The negative electrode for a lithium ion secondary battery according to claim 1, wherein a cross-linking degree of the polyacrylate cross-linked with magnesium or alkaline earth metal is 1 to 90% relative to the carboxylic groups included at terminals of side chains of the polyacrylic acid.

3. The negative electrode for a lithium ion secondary battery according to claim 1, wherein an average polymerization degree of the cross-linked polyacrylate is 3,000 to 30,000.

4. A lithium ion secondary battery comprising the negative electrode for a lithium ion secondary battery according to claim 1.

5. The negative electrode for a lithium ion secondary battery according to claim 1, wherein the negative electrode active material comprises elemental silicon.

6. The negative electrode for a lithium ion secondary battery according to claim 1, wherein the negative electrode active material comprises silicon oxide.

7. The negative electrode for a lithium ion secondary battery according to claim 1, wherein the negative electrode active material comprises a silicon compound selected from the group consisting of $SiB_4$, $SiB_6$, $Mg_2Si$, $Ni_2Si$, $TiSi_2$, $MoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, and $ZnSi_2$.

8. The negative electrode for a lithium ion secondary battery according to claim 1, wherein the total weight of the silicon component in the total weight of the negative electrode active material is 20 wt % or more.

9. The negative electrode for a lithium ion secondary battery according to claim 1, wherein the total weight of the silicon component in the total weight of the negative electrode active material is 40 wt % or more.

10. The negative electrode for a lithium ion secondary battery according to claim 1, wherein a cross-linking degree of the polyacrylate cross-linked with magnesium or alkaline earth metal is 30 to 90% relative to the carboxylic groups included at terminals of side chains of the polyacrylic acid.

11. The negative electrode for a lithium ion secondary battery according to claim 1, wherein an average polymerization degree of the cross-linked polyacrylate is 6,500 to 30,000.

12. The negative electrode for a lithium ion secondary battery according to claim 1, wherein an average polymerization degree of the cross-linked polyacrylate is 3,000 to 11,000.

* * * * *